United States Patent [19]

Lemelson et al.

[11] Patent Number: 5,004,442
[45] Date of Patent: Apr. 2, 1991

[54] EDUCATIONAL TOYS

[76] Inventors: Jerome H. Lemelson; Dorothy Lemelson, both of 48 Parkside Dr., Princeton, N.J. 08540

[21] Appl. No.: 212,186

[22] Filed: Jun. 27, 1988

[51] Int. Cl.$^5$ ............................................. G09B 00/00
[52] U.S. Cl. .................................... 446/302; 446/268
[58] Field of Search ................ 446/268, 297, 302, 321

[56] References Cited

U.S. PATENT DOCUMENTS

| | | | |
|---|---|---|---|
| 1,591,905 | 7/1926 | Williams | 446/268 X |
| 2,627,699 | 2/1953 | Schuettenhelm | 446/297 |
| 2,669,803 | 2/1954 | Morgan | 446/268 |
| 3,234,687 | 2/1966 | Elwell | 446/302 |
| 3,384,074 | 5/1968 | Rautiola et al. | 446/297 X |
| 3,495,351 | 2/1970 | Bear et al. | 446/302 X |
| 4,719,656 | 1/1988 | Godinet | 446/268 X |
| 4,818,233 | 4/1989 | Behan | 446/268 X |

*Primary Examiner*—Robert A. Hafer
*Assistant Examiner*—S. Rimell

[57] ABSTRACT

Improvements in figure toys, such as dolls which are configured, decorated, clothed and provided with toys and accessories to educate and entertain, to simulate growth and provide the appearance of the same living being or person at different stages of growth and development. In one form, a series of lifesize or scaled dolls or figure toys are each constructed and facially shaped to represent the same living being or person at a different age or stage in its development. In a particular form, baby dolls are designed and constructed to represent the same person shortly after birth, six months old, twelve months old, two and three years old. In such form, all dolls are manufactured and constructed approximately to scale if not full size. The facial features of one doll are substantially those of the other dolls at their respective simulated ages. Clothing and accessories for each doll are those which would normally be provided to dress a baby or child of a similar age.

In another form, accessories, such as a birth certificate, innoculation papers, graduation or promotion papers, and other documents associated with a growing person or child, are provided to educate and teach children owning such series of dolls as are other accessories such as those generally associated with infants and children of different ages such as a feeding bottle, a pacifier, toys, head gear, etc.

20 Claims, 3 Drawing Sheets

EDUCATIONAL TOYS

BACKGROUND OF THE INVENTION

1. Field of the Invention

This invention relates to educational toys, particularly in the form of a series for a plurality of series of dolls or figurines wherein each series is representative of the same person at different stages or ages in its development. Each series thus defines a toy group which is both educational and entertaining or possessive of substantial play value together with accessories and clothing for each doll which is representative of the clothing worn by an infant or child of the age the figurine or doll is shaped and intended to represent.

2. Description of the Prior Art

The prior art comprises individual dolls per se representative of individual infant, babies, children or grown ups but does not indicate or teach characteristics of a series of figures of the same individual or person at different ages in its development.

SUMMARY OF THE INVENTION

Figure 1:
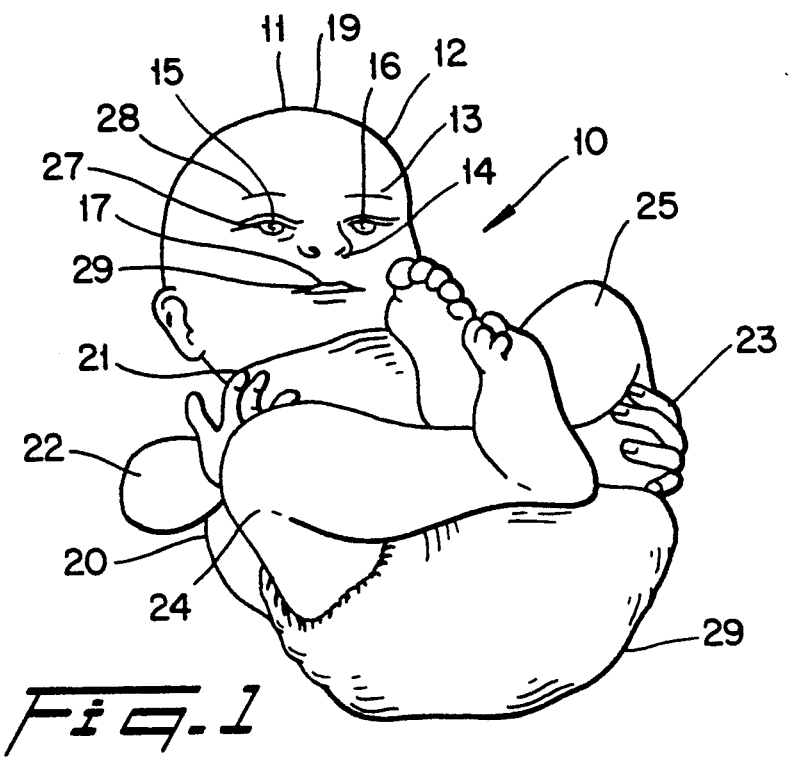
FIG. 1 is an isometric view of a figurine or doll which is representative of a newborn female infant which is several weeks to a month or two old.

This invention relates to educational toys and in particular to figurines, dolls and the like constructed, decorated and dressed as a series representing the same person at different ages or stages of such person's development. As such, the series serves to teach children certain features and characteristics of growth of a species of living being, such as infants and children. In a preferred form of the invention, a series of dolls, three or more in number, are constructed, sized, decorated and dressed to represent (a) an infant or baby, (b) a six to twelve months old, (c) an eighteen to twenty four months old, (d) a two to three year old and, if so presented with the series, a child one or more years thereolder.

If properly shaped and scaled, such as series of figurines or dolls, when presented to a child or group of children, they will not only have substantial play value in the make-believe world of children, but will also have considerable educational value in that the toy(s) will teach the features and characteristics of a growing living being at different stages in its development.

Suitable accessories and clothing associated with infants and young children of the ages the dolls are intended to represent are provided with each doll or figurine as are simulated accessories and toys which are generally associated with infants and children of such age groups. For example, the infant or born may be presented in a diaper and/or a wrap around blanket.

The doll representing the same living being at six to twelve months of age may be presented in clothing, such as pajamas or a pull over nightgown and a baby bottle. The twelve to twenty four month old may be provided with a pacifier and in cloths generally worn by a child of such age as well as simulated teething and other crib toys. A bassinette may be provided with the doll representing the newborn living being while a small crib may be provided for the next two dolls in age line. The two year old(s) and dolls representing children of greater age may be presenting in dresses, shorts or long pants, blouses, hats and shoes, etc. for realism and play value.

Accordingly it is a primary object of this invention to provide new and improved teaching and educational toys having substantial entertainment and play value.

Another object is to provide improvements in educational toys which simulate growth and development.

Another object is to provide an improved educational toy defined by a plurality of different figures, such as dolls, mannequins or stuffed toys, which represent the same individual human being or animal at different stages or ages of its development.

Another object is to provide an educational toy formed of a plurality of dolls or figurines of the same person having head, facial and body features which are similar and which indicate to a child playing with same, the development of an infant or baby into a pre-schooler or kindergarten age child.

Another object is to provide toy doll constructions which may be designed and presented in various series, each of which series represents a different person at different stages in its growth or development in a manner to educate and teach such growth and development.

Another object is to provide a new and improved educational toy formed of a series of dolls or figurines representing the same living being in different stages of its development and containing suitable clothing and accessories associated with said different development stages for teaching a child the growing up or development of the living being which such dolls or figures represent.

Another object is to provide a method for teaching human development by providing a child with a series of figurines or dolls which are bodily and facially shaped, decorated and clothed to represent the same person at different stages in its development such as at or near birth, in the first half to year of age, during the next six to twelve months of its growth and thereafter during one or more periods of its development and growth.

Another object is to provide a method for teaching children how human beings develop and grow by providing a child or children with realistically shaped, decorated and dressed figures of the same person at different stages or ages in its development and with accessories generally associated with human beings at such different ages or periods in their development.

Another object is to provide a method for teaching human development by providing a series of figurines or dolls which are both bodily and facially shaped, decorated and clothed to represent the same person at different stages in its development and including with each figurine or doll a record playback unit with recordings of different speech may be associated with speech spoken by individuals of the same ages and which sound as if they are spoken by the same person at such different ages.

Another object is to provide a series of figure toys or dolls which are shaped and decorated to represent the same individual at different ages in its growth and which are constructed with movable components, such as lips which are synchronized in their movement to the playback of audio signals of select speech which a child playing with such toys may discern and perceive as realistically produced by each doll so as to teach and realistically provide the player with information about the development of the person the dolls are intended to represent by means of such realistic actions and the speech so generated.

With the above and such other objects in view as may hereinafter more fully appear, the invention consists of the novel constructions, combinations and arrangements of body and facial components of figure toys defining the instant invention but it is also understood that changes, variations and modifications may be resorted to which fall within the scope of the invention as claimed without departing from the nature of the invention.

DETAILED DESCRIPTION OF THE INVENTION

FIGS. 1–4 illustrate four different figure toys in the configurations of dolls, each representing the same individual or person at a different stage in its growth or development. In FIG. 1 is shown a baby doll toy 10 in the configuration of a newborn infant preferably as it would appear at birth or within the period ranging from birth to about a month old. The figure toy 10 contains a head portion 11, preferably formed of plastic resin and shaped with a facial portion 13 forming the front of the skull portion 12 of the head 11. Molded integral portions of the face portion 13 include a nose portion 14, respective left and right eyes 15 and 16, a mouth portion 17, a jaw portion 18, and simulated hair 19 which may or may not be rooted, it being preferably formed as fine ridge-like protrusions from the top of the head portion which are integrally molded therein. Other configurations of the hair of the doll may include suitable rooted groups of fine, silk-like filaments or a padded formation of such filaments bonded to the scalp portion of the head.

The head 11 of doll 10 is shown pivotally secured and in frictional assembly with the neck portion 21 of the torso 20 of the figure toy. Molded plastic arms 22 and 23 and legs 24 and 25 are respectively joined at their ends to respective molded portions of [not shown] the torso and may be constructed to pivot thereon for realism.

Figure toy 1 is shown facially decorated with silk screened or sprayed on decorations 27, 28 and 29 which respectively represent and highlight the eyes, eyebrows and lips of the figure toy.

While the toy 10 is shown dressed in a diaper 29 it may also be marketed wrapped in a small blanket or cloth as is a newborn baby or infant a few weeks old. It may be marketed with one or more crib toys, a baby bottle or pacifier.

Figure 2:
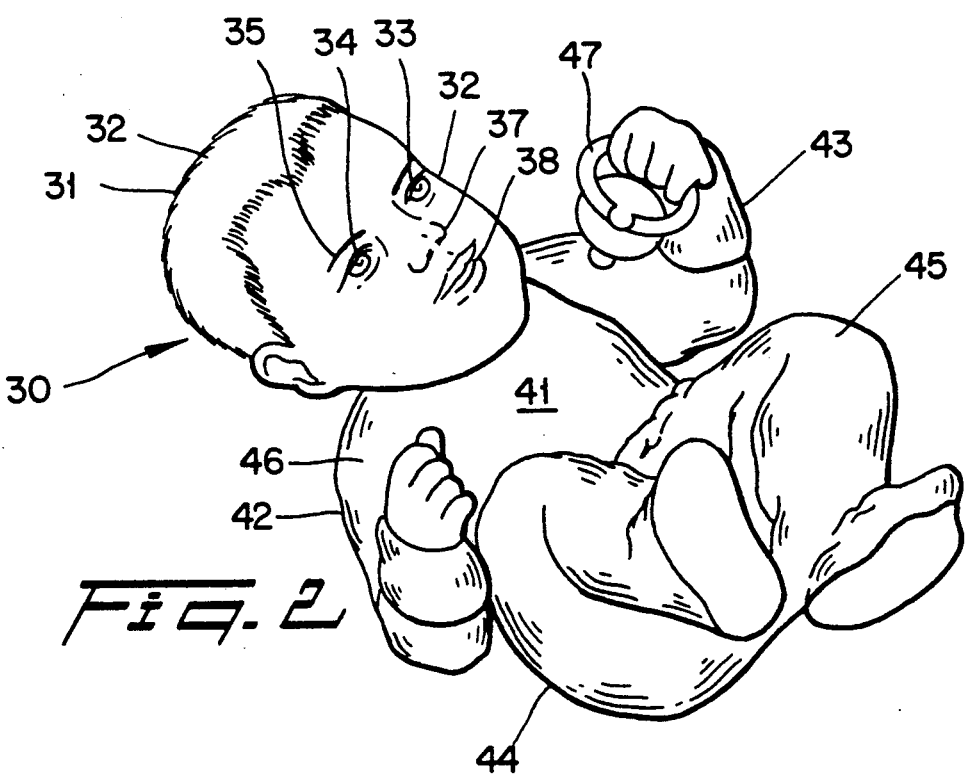
FIG. 2 is an isometric view of a figurine or doll which is larger than the doll of FIG. 1 and which represents the same baby or person as that shown in FIG. 1 at an age of nine to twelve months having substantially similar facial features as those of the doll of FIG. 1 to a degree that it may be recognized as the same person as that shown in FIG. 1 in or more advanced stage of its growth or development.

In FIG. 2 is shown details of a figure toy 30 having a head portion 31 which is larger than the head of the figure toy 10 and is shaped, configured and decorated to represent the same living being as that defined by the newborn infant of FIG. 1 having grown to an age in the range of six to twelve months from birth. The face 32 thereof contains facial features 33 to 38 which are shaped and decorated to represent substantially the same facial features as those found in the toy 10 of FIG. 1 and changed therefrom only with respect to normal growth of the child or infant. The head 31, torso 41, arms 42, 43, and legs 44, 45 are dimensioned and constructed to represent those of the person or baby illustrated in FIG. 1 at an age which may vary between nine months and fifteen months while the clothing 46 is appropriately designed to represent clothing worn by a child or infant of such age. In FIG. 2 the figure toy or doll 30 is shown dressed in jumper pajamas in the form of a pullover which covers the upper torso, the legs and feet of the doll, whereas in FIG. 1 the baby or infant doll 10 is shown wearing diapers 26 and is configures to lie flat on its back with the feet 25,25 thereof bent at the knees, as shown.

While the baby doll 30 of FIG. 2 is shown with a simulated pacifier 47 being grasped in its left hand, other crib toys may supplement or replace same and be presented with the toy as accessories. Similarly, the clothing may also be varied and changeable by a child playing with the doll for added realism, educational and play value.

A bassinette or crib may also be provided with the doll 30 of FIG. 2 as well as the doll 10 of FIG. 1

Figure 3:
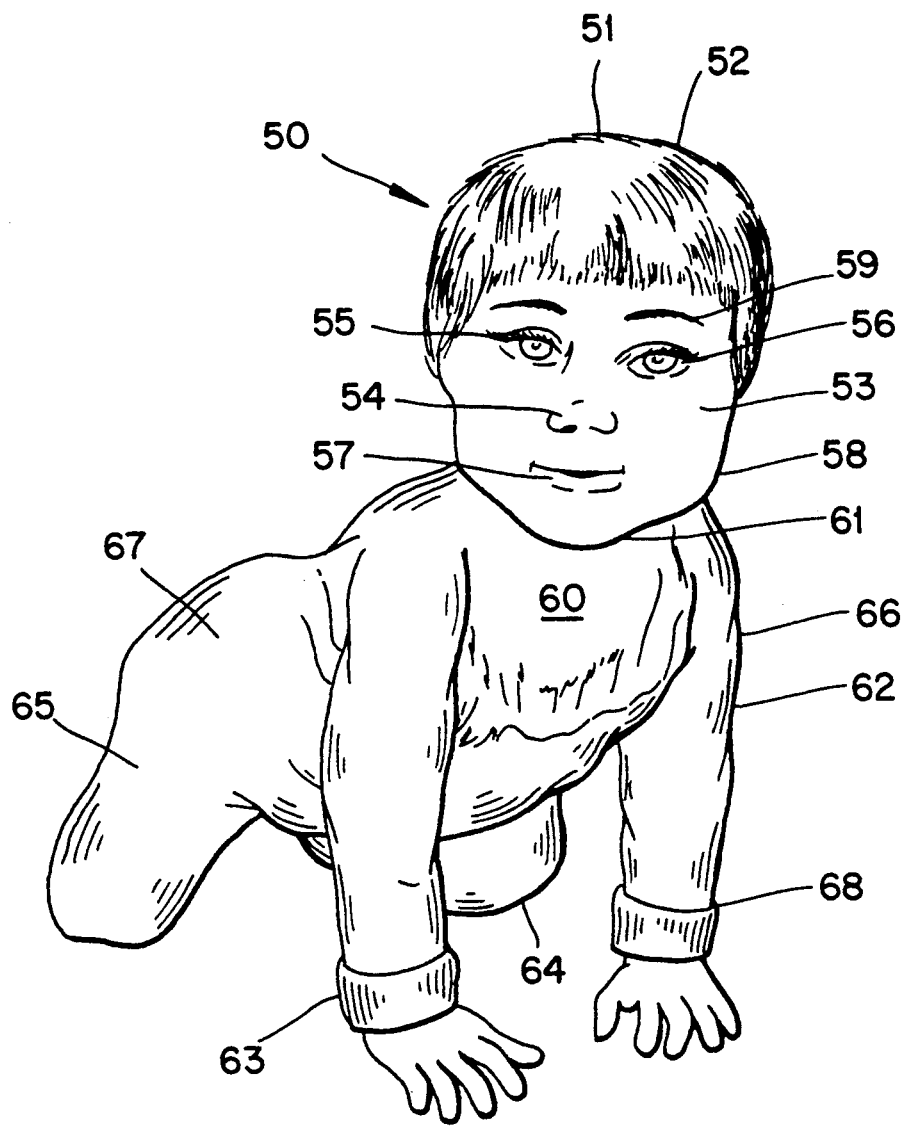
FIG. 3 is an isometric view of a figurine or doll on its knees representing a baby twelve to eighteen months old and having facial features which may be recognized as similar to those of the dolls of FIGS. 1 and 2 to provide an indication that such doll is the same person as that represented by the dolls of FIGS. 1 and 2.

In FIG. 3 is shown a figure toy or doll 50 which is configured, decorated and dressed to represent the same person as that defined by the figurines or dolls shown in FIGS. 1 and 2 at an age which is six to twelve months older than that defined by the doll 30 of FIG. 2. The doll 50 is shown in a kneeling or crawling position or attitude and it preferably may be made to be able to stand on its feet. A head portion 51 is immovably or pivotally supported on a torso portion 60 via a neck portion 61 and contains rooted or molded-decorated simulated hair 52, a facial portion 53 shaped with a lower jaw portion 58. Additional facial features include simulated eyes 55 and 56 which may be formed of molded portions of the molding comprising the head 51 decorated with ink or paint to define the eye lashes and eyeball portions or provided as eye shaped inserts attached in cavities molded in the head. A mouth portion 57 and eyebrows 59 are also suitably decorated with paint or ink for realism. A nose portion 54 is molded integral with the face portion 53 and, together with the other face portions are so shaped and decorated that a person viewing the figurines or dolls of FIGS. 1 to 3 will note the likliness of same and indicate to such person that all three dolls represent the same living being or child at different stages or ages in its growth or development.

Connected to the torso 60 of the doll 50 are flexible arms 62,63 and legs 64,65 which are so shaped and sized as to further indicate that the doll 50 is a representation of a more grown version of the same baby represented by the dolls 10 and 30 of FIGS. 1 and 2. Clothing 66 worn by doll 50 includes pants or rompers 67 and a shirt or blouse 68. While not shown, a variety of accessories may be provided with the doll 50 to add to the realism and add educational value, such as various toys, changes in clothing, a crib, walker, jumper, riding toys, squeeze toys, etc.

Figure 4:
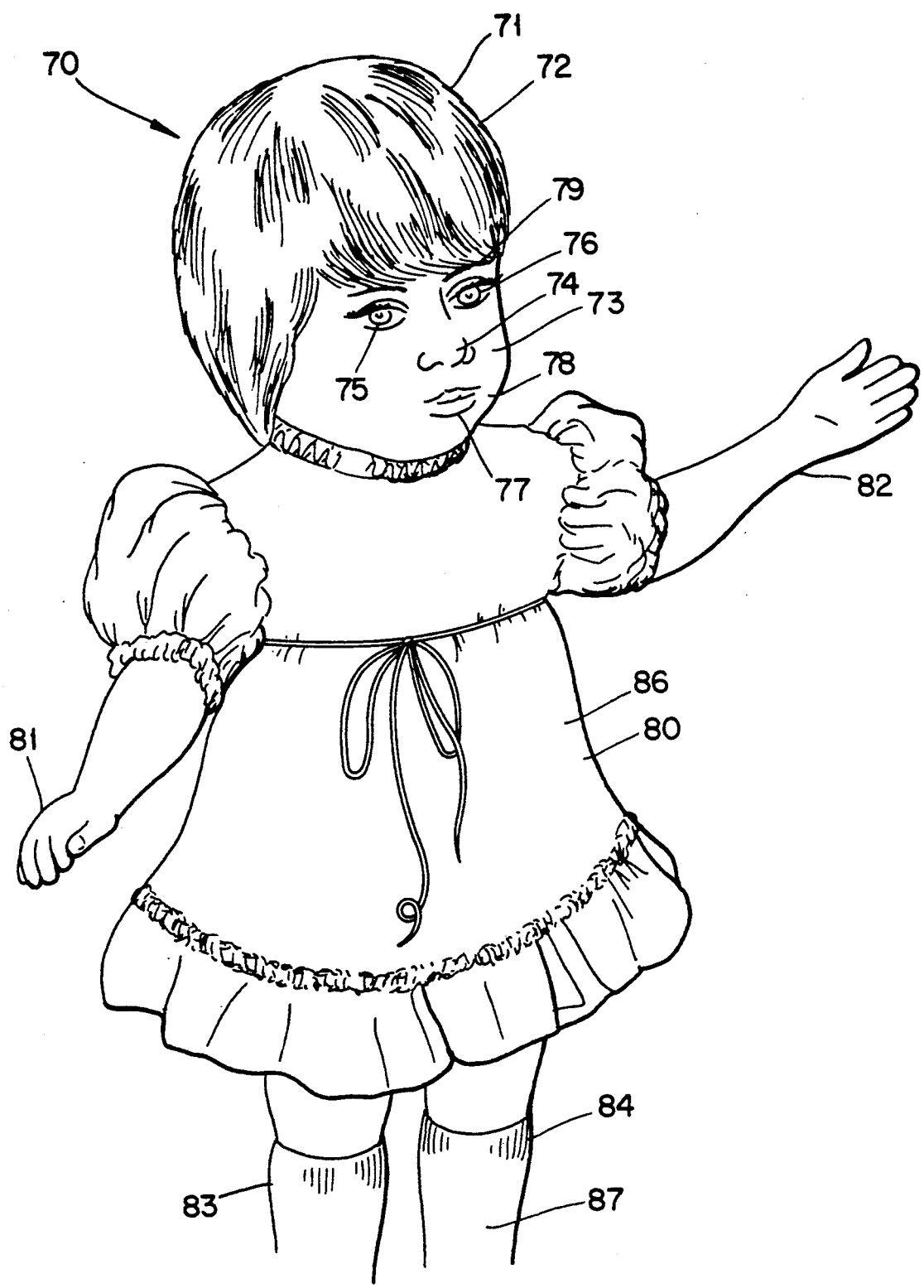
FIG. 4 is an isometric view of a female doll in a standing attitude which is representative of a child in the range of two to three years old and having facial features which may be recognized as being similar to those of the dolls of FIGS. 1 to 3 so as to provide an indication that such doll is the same person as that represented by the dolls of FIGS. 1 to 3.

In FIG. 4 is shown a figurine or female doll 70 representing a child in the age range of two to three years and having a head 71 molded of plastic or other material which is pivotally secured to a torso or body portion 80 via a neck portion. Appendages in the form of simulated arms 81,82 and legs 83,84 are fixed or pivotally secured to respective portions of the torso. The head 71 contains either molded representations of hair or rooted hair 72 secured thereto. The facial portion or face 73 is shaped simulated eyes 75,76 which may also be formed of separate moldings or assemblies secured in respective cavities formed in the head to present a more realistic indication of eyes and/or provide eye movement by conventional means. The nose 74, jaw 78 and lips 77 together with the eyes 75,76 are so shaped and decorated as to represent a female figure toy which is the same person as that defined by the figure toys 10,30 and 30 of FIGS. 1, 2 and 3 and easily discernable as such person by a child playing with same.

Clothing 86 for the female child doll of FIG. 4 is in the form of a one piece dress 86 which may be varied and provided as other forms of clothing. Socks or stockings 87 are shown on the legs 83,84 and shoes (not shown) may also be provided for realism, as may other articles of dress such as hats, coats and the like. Accessories may include small toys such as dolls, pocket books, and the like items which a three to four year old girl will play with or possess and may be provided with or sold separate from the respective dolls they are intended to accompany to add to the play value thereof.

Additional features of the toys or doll series defined by the instant invention are noted as follows:

1. Each of the dolls or figurines 10,30,50 and 70 of FIGS. 1 to 4 may be provided with a sound generating device, such as a magnetic tape or disc player or solid state speech generating electronic circuit and speaker together with self-contained battery(s) for generating representative sounds and speech associated with infants, babies and children which such figures represent. The infant 10 of FIG. 1 may, for example, contain in its hollow torso 20 a simple bellows crier mechanism of conventional design or a more complex disc, tape or electronic memory playback unit for such sounds as simulated crying, gurgling, cooing and the like . The infant or baby doll 30 may contain in its hollow torso a similar record playback mechanism capable of playing back, when activated by a sound or mechanically activated normally open switch, typical baby sounds such as cooing, crying, and simulated simple words. The baby doll 50 of FIG. 3 may contain in its hollow torso such a record playback mechanism, which when activated by hand pressure, gravity or sound activated switch, will play back sounds and speech normally associated with a 12 to 24 month old baby it is intended to represent, such as single or multiple words, crying, shouting, laughing, giggling and the like. The girl simulating doll 70 of FIG. 4 may contain such a record playback mechanism in its hollow torso or head which is operable when a normally open switch therein is so activated by hand pressure, sounds or speech recognition electronic circuitry to play back words of speech and sentences, laughing, crying, giggling and other sounds.

All of the sounds described above are preferably so recorded and played back to simulate sounds and speech of the same person at the respective representative ages each doll is intended to represent.

2. To add to the play value and realism of the toy series defined by the figure toys or dolls of FIGS. 1 to 4, a simulated birth certificate may be provided with the simulated infant or newborn doll 10 of FIG. 1, while one or more simulated medical forms or sheets containing printed matter, such as inoculations and dates of same, may also be provided filled out prior to purchase or thereafter by the purchaser.

3. While the four dolls illustrated in FIGS. 1 to 4 are constructed and decorated to represent what may be discerned or perceived as a white Caucasian child at various ages in its early growth, its is noted that toys of the type defined by the instant invention may be designed and manufactured to represent an endless number of individuals of the same and different races and nationalities. In other words, a variety of series containing three, four, five or more figurines or dolls each, which are shaped, decorated and clothed in apparel associated with various nationalities, ethnic groups, tribes and people from countries and regions throughout the earth, may be designed, manufactured and marketed to appeal to children of the various nations of the world and to educate children of certain nations as to the appearance and dress of children of other nations and races as represented by different doll series. Such educational functions may also be enhanced by the provision with each doll of one or more accessories or toys associated with the nationality with which the series of dolls is intended to represent. To further enhance the educational value of each doll and series thereof, each doll marketed may be provided with a book or booklet illustrating and describing various characteristics of the dolls of the series, associated, for example, with children and the intended race or nationality of the dolls.

4. To further enhance the play and educational value of each doll and the series thereof which is marketed, and to identify those dolls intended to make up each series, human readable indicia may be provided in one or more forms with each doll, such as such as by printing, screening and/or molding such information as the name or names of the dolls, characters defining each series or the like on select locations of the doll's body or head and/or on tags secured to the bodies or limbs of the dolls and/or the container in which they are sold. Furthermore, if each doll is provided with a record playback unit, it may contain a recording therein of words of speech identifying and naming the doll, its series and country, county or state of origin, as well as other information intended to add to its play and educational value. Such information may be played back per se or with accompanying lip movement to more realistically simulate the act of speaking and add to the play and educational value of the toy.

5. If the doll series contains one or more dolls which are shaped, decorated and dressed to represent older children and/or teenagers, the dress, hairdo, makeup and accessories associated with such older children and adults may also be provided to add to the play and educational value of the toys.

6. Dolls designed and constructed to represent children of nationalities other than that of the child playing with same, may contain speech signal recordings in their record playing units in two or more languages including the language of the person playing with the doll and a foreign language associated with the doll, both so recorded and playable from memory or record member in a manner to teach words and phrases of the foreign language to the child or children playing with the dolls.

7. If a speech recognition microelectronic chip, such as the General Instruments SP-1000 is employed along with a synthetic speech signal generating chip or record playback unit containing a plurality of different recordings of speech, and is operable to receive input command signals derived when a microphone in the doll senses sounds of select speech spoken by the child playing with the doll, such command signals may be employed to effect the playback from such record playback unit or speech chip of select speech signals defining select words of speech in the same and/or different language as that spoken into the microphone, thereby adding to the play and teaching value of the toy. Select playback of select speech signal recordings from such memory or record player may also be accompanies by the select playback of accompanying control signals from the same or auxiliary memories, wherein such latter control signals are applied to control the operation(s) of one or more electric motors in synchronization with the generations of sounds of one or more words of speech, which motors may effect controlled movement of movable components of the doll such as the lips and/or jaw in the simulated act of speaking, the head in turning and/or nodding movement(s), the torso, arms, legs, etc.

What is claimed is:

1. An educational toy comprising in combination:
   (a) a series of figure toys, each representative of the same living being at a different stage in its growth and development,
   (b) each of said figure toys having a head portion and a torso portion connected to said head portion,
   (c) the head portion of each of said figure toys having a facial portion,
   (d) each of said facial portions of each of said figure toys being shaped and decorated to correspond to the same individual at said different stages of its growth.

2. A toy in accordance with claim 1 wherein the physical characteristics of each of said figure toys is to scale and dimensioned to represent the same human individual at said different stages of its growth.

3. A toy in accordance with claim 2 wherein the scale of the physical characteristics for each or said figure toys is the same.

4. A toy in accordance with claim 2 wherein the scale of the physical characteristic for each of said figure toys is full scale.

5. A toy in accordance with claims 2 wherein the scale of the physical characteristics for each of said figure toys is less than full scale.

6. A toy in accordance with claim 2 wherein the scale of the physical characteristics for each of said figure toys is at least two-thirds full scale.

7. A toy in accordance with claim 1 wherein the head of at least one of said figure toys is produced from sculpture of the head of at least another of said figure toys.

8. A toy in accordance with claim 1 wherein each of said figure toys contains head, torso, arm and leg portions which are molded of plastic.

9. A toy in accordance with claim 8 wherein said head, torso, arm and leg portions of each of said figure toys may be relatively moved with respect to each other.

10. A toy in accordance with claim 1 including accessories for each of said figure toys are representative of accessories associated with the living beings at said different stages of growth represented by each of said figure toys.

11. A toy in accordance with claim 1 wherein said figure toys are shaped, decorated and dressed to represent an infant, a baby representation of the same infant less than one year of age, a baby representation of the same infant less than two years of age and a baby representation of the same infant less than three years of age.

12. A toy in accordance with claim 1 wherein each of said figure toys includes a record playback unit which contains a plurality of recordings of different speech and means for selectively playing back and generating respective sounds from each of said recordings,
   each of said recordings of each playback unit is operable, when selectively played back, to generate respective speech sounds characteristic of a human being at said different stages of growth development.

13. A toy in accordance with claim 12 wherein said recordings generate the respective sounds characteristic of the same human person represented by said series of figure toys.

14. An educational toy comprising:
   (a) a series of figure toys each defining a doll and each having a simulated head, a torso, arms and legs,
   (b) the head of each figure toy having a face portion,
   (c) each of said face portions being shaped with facial features including eyes, a nose, mouth, chin, lips and other facial characteristics,
   (d) a first of said series of dolls being configured with a body, limbs and a head having a face with facial features representing a living being at an early stage of its development, such as in its infancy,
   (e) a second of said dolls representing the same living being as said first of said dolls at a second later stage in its growth,
   (f) said second of said dolls having facial features similar to those of said first doll but larger in size and configured to represent the face of the same living being as that represented by the face of said first doll,
   (g) the body and limbs of said second doll being correspondingly larger than the body and limbs of said first doll to conform to the simulated growth of said doll to the attainment of said later stage of growth in its development.

15. A toy in accordance with claim 14 wherein there are at least four figurines or dolls each designed, sized and configured to represent the appearance of the same living being during four different stages of its developmental growth.

16. A toy in accordance with claim 15 wherein the physical characteristics of each of said dolls is constructed to substantially the same scale with respect to the stage of developmental growth of the living being represented.

17. A toy in accordance with claim 15 wherein said four figurines or dolls are respectively configured and decorated to represent the same living human being at approximately the growth stages of a recent newborn baby, a nine month old baby, an eighteen month old child and a twenty-four month old child.

18. An educational toy comprising in combination:
(a) a series of human figure toys, each representative of the same living person but distinguishable from each other by its appearance at a period of time in a stage of growth such that a readily noticeable difference in appearance exists for each figure toy, said noticeable difference being in physical characteristics such as body size and shape, facial components and the like,
(b) each of said figure toys having a record playback unit secured therein and operable to generate signals of select speech, and a speaker and amplifying means for generating audible sounds of select speech in the vicinity of the respective figure toys,
(c) each of said record playback units having a plurality of recordings of speech such as select words of speech generally associated with a person represented by the respective figure toy,
(d) switch means for selecting said recordings to produce audio signals, and
(e) amplifying and transducing means for converting said audio signals to sounds of speech,
(f) each of the sounds of speech generated when each record playback unit is activated being constructed, inflected and modulated to produce speech characteristic of said living person at each respective stage of growth.

19. An educational toy in accordance with claim 18 wherein
each of said record playback units contains a plurality of control signal recordings and switch means for activating a selected of said control signal recordings to produce speech therefrom,
each of said figure toys containing an animation means and control means therefor operable to receive control signals generated simultaneously with select speech signals generated from the record playback unit of the toy to control the operation of said animation means as sounds of speech are generated to provide one or more of such effects as lip movement, mouth and head movement or other form of animation.

20. An educational toy in accordance with claim 1 wherein
there is a plurality of series of dolls,
each series defines a plurality of figure toys representing the same human person at different stages of growth in its development, and
each series defines a person of a different race or nationality and contains corresponding clothing for each of the dolls associated with the representative race or nationality thereof.

* * * * *